A. J. BROWN.
BANDING MACHINE.
APPLICATION FILED MAY 15, 1911.

1,180,232.

Patented Apr. 18, 1916.

Witnesses
Rob. E. Stoll.
Chas. L. Byron.

Inventor
Arthur J. Brown.
By Chas. E. Lord
Attorney

UNITED STATES PATENT OFFICE.

ARTHUR J. BROWN, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

BANDING-MACHINE.

1,180,232.  Specification of Letters Patent.  Patented Apr. 18, 1916.

Application filed May 15, 1911. Serial No. 627,205.

*To all whom it may concern:*

Be it known that I, ARTHUR J. BROWN, a citizen of the United States, residing at Milwaukee in the county of Milwaukee and State of Wisconsin, have invented certain new and useful Improvements in Banding-Machines, of which the following is a full, clear, and exact specification.

This invention relates to banding machines or machines for banding wire or similar material tightly about members to be reinforced.

It is customary to retain in place armature windings and other rotor windings of various types of dynamo-electric machines against the action of centrifugal force by banding wire around such windings. Banding wire is wound tightly around the windings in a great many instances by placing the member, such as a rotary member, between the centers of a lathe and rotating the member the windings of which are to be provided with retaining wire. This is a very good and successful method of accomplishing the desired result. But in cases where the member or rotor is too large for the lathe it is necessary to band the windings by other means.

It is the object of this invention to provide means whereby windings, and especially rotor windings of any size machine, can be provided with band wire or other banding material for retaining such windings in their proper places.

The various novel features of my invention will be described in the following specification and particularly set forth in the appended claims.

The invention is illustrated on the accompanying sheet of drawings in which—

Figure 1:
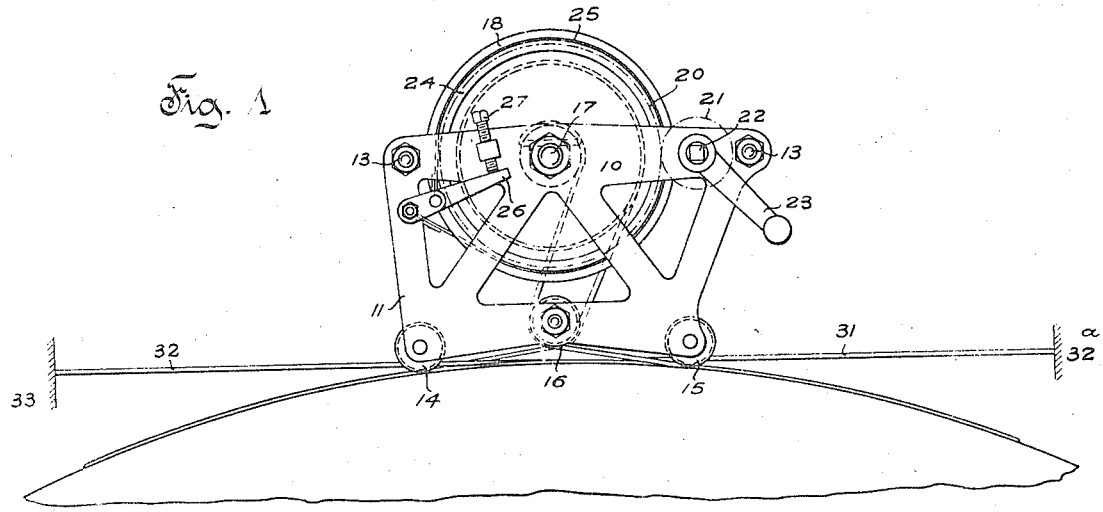
Figure 3:
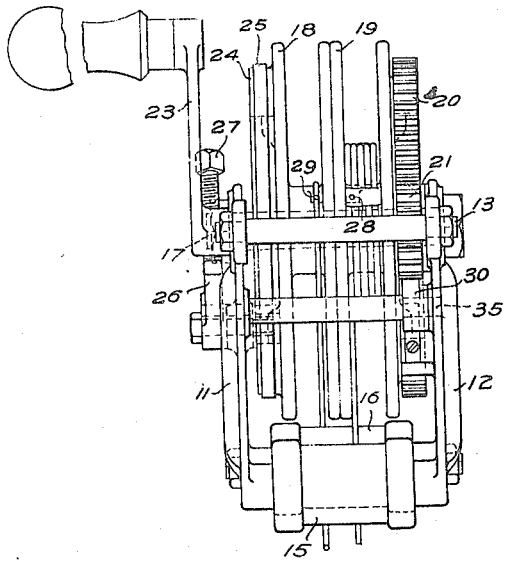
Figure 2:
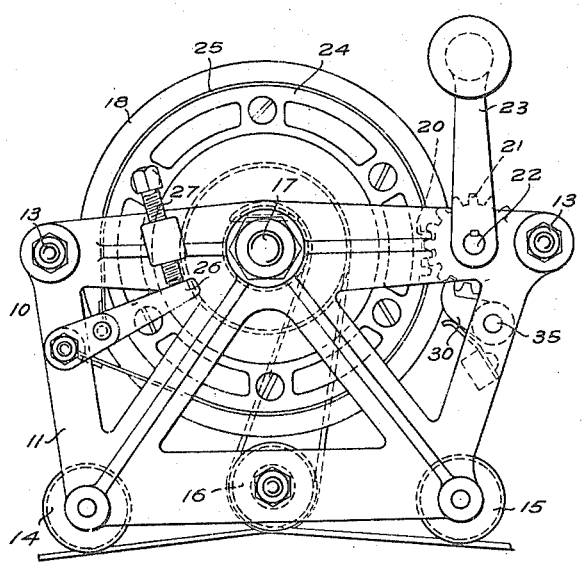

Figure 1 is a banding machine shown somewhat diagrammatically and constructed in accordance with my invention and is illustrated as being used for banding wire around the windings of a rotary member of large diameter, and Figs. 2 and 3 are side and front elevations respectively of the same banding machine.

This banding machine includes a frame 10 having two side plates 11 and 12 supported and retained a predetermined distance apart by bolts 13 which pass through said plates. Supported and mounted between the plates 11 and 12 are a plurality of rollers 14, 15, and 16, two of the rollers 14 and 15 of which are adapted to roll over the surface of the windings to be banded in place, the other roller 16 being located between the other two rollers 14 and 15 and over which the banding wire is adapted to pass while being put on and taken off the winding to be reinforced. The rollers 14 and 15 also act as guides for properly placing the different rows of banding material. Also mounted between the plates 11 and 12 is a shaft or support 17 upon which are loosely mounted two spools or members 18 and 19 adapted to receive the wire or material to be used for holding the windings in place. These spools are not connected to each other and are capable of relative movement. Secured to the spool 19 is a gear wheel 20 which meshes with another gear wheel 21 keyed to a shaft 22 which is supported between the plates 11 and 12 and is provided with an operating handle 23. By means of this gear connection the spool 19 is adapted to be actuated. Secured to the other spool 18 is a brake wheel 24 which is engaged by a brake band 25 the ends of which are secured to a lever 26 pivotally mounted on the plate 11. This lever 26 is engaged by a bolt 27 adjustably mounted in the plate 11 and which is adapted to regulate the effective braking effort. The spool 19 is preferably used for receiving the temporary banding wire, one end of which is secured in an eye 28. The temporary banding wire is measured and wrapped around the windings preparatory to placing the permanent band around such windings. The permanent band is wound on the spool 18 and one of its ends is secured in another eye 29. The gear wheel 21 is adapted to be engaged by a spring-pressed pawl 30 which is supported on a rod 35 secured in the frame 10, said pawl being adapted to prevent backward movement of the banding machine.

When it is desired to wrap a retaining band tightly about the windings of a rotating or other member, one end of the temporary band 31 is secured to a support 32ª and wrapped about said windings with the desirable number of turns. As above stated, the other end of the temporary banding wire is secured in the eye 28 of spool 19. With one end of the permanent banding wire 32 secured to another support 33, the handle 23 may be rotated to rotate the intermeshing gear wheels 21 and 20 to roll the temporary banding wire on the spool 19 as the banding machine moves over the object to be wound. At the same time the wire to form the permanent band is rolled off the spool 18 and due to the braking or retarding action on said spool, the permanent band wire may be wrapped around the windings with the desirable degree of tightness, the degree of tightness being regulated by moving the adjusting screw 27 one way or the other. During the continued turning of the handle 23 and movement of the machine over the windings to be retained, the temporary band is removed from the windings and wrapped on the spool 19 and the wire forming the permanent band rolled off the spool 18 onto the windings to be secured in place. After the measuring or temporary banding wire has been wound off the winding to be secured and wound onto the spool 19 the proper length of wire forming the permanent band has been removed from the spool 18 and wound tightly around the windings to be secured. At this point the permanent banding wire may be soldered or otherwise fastened together to form a substantial unitary retaining band.

The motion transmitted to the spool 18 of the banding machine to make it move is directly due to the winding up of the wire forming the temporary band and it is during this movement that the wire forming the permanent band is wrapped around the windings to be retained. There is no slack in the permanent band as is present in the temporary band due to the fact that the two spools 18 and 19 move independently of each other and also due to the fact that neither of said spools is connected to the shaft 17. The spools may be rotated in the same direction at the same time, but when the temporary band is being taken off and the permanent band is being wound on the windings, the spools rotate in opposite directions.

There may be various arrangements of the parts here shown and also other modifications, and I intend to cover all such modifications which do not involve a departure from the spirit and scope of my invention as set forth in the appended claims.

What I claim as new is:

1. In a machine for applying banding material to a body, a support movable about the body to which said banding material is to be applied, a plurality of independently movable spools mounted on said support and adapted to carry independent sections of banding material in the normal operation of the machine, and means for applying power to actuate one of said spools, actuation of said latter spool when said machine is operatively associated with said body and banding material therefor causing the unwinding of one section of banding material from said body and the winding of another section of banding material on said body.

2. In a banding machine, a plurality of members adapted to carry banding material, means for actuating one of said members, and means for retarding another of said members, one of said members being adapted to have banding material taken therefrom and another of said members being adapted to have banding material wound thereon during a single movement of said machine.

3. In a banding machine, a frame, a shaft mounted in said frame, independently movable spools mounted on said shaft and adapted to carry banding material, means for actuating one of said spools, and a brake for retarding the movement of another of said spools, said brake being rendered operative on the actuation of said first spool in the banding operation.

4. In a banding machine, a frame movable about a body to which banding material is to be applied, a shaft mounted in said frame, independently movable spools mounted on said shaft and adapted to carry banding material, gear connections for actuating one of said spools, a brake for retarding the movement of another of said spools, and rollers mounted in said frame for guiding said banding material and said frame in its movement.

5. In a machine for applying a retaining band to a body, a support movable about the body to which said retaining band is to be applied and comprising two spaced members, independently movable spools mounted between said members and adapted to carry separate retaining bands, and means for positively operating one of said spools.

6. In a machine for applying banding material to a body, a support movable about the body to which banding material is to be applied, independently movable spools coaxially mounted on said support, and means for positively operating one of said spools.

7. A machine for applying banding material to a body, said machine being movable about said body in the operation of applying said banding material and comprising a plurality of independently movable members each adapted to carry a section of banding material to be applied to the body, and means for positively operating one of said members, the operation of said latter member causing the movement of said machine about said body and the winding of one section of banding material onto said body from the other of said members.

8. In a banding machine, a plurality of independently movable spools adapted to carry banding material to be applied to a body, means for positively operating one of said spools to cause the winding of one section of banding material onto said latter spool and to cause the winding of a second section of banding material from a second spool onto said body, and means for varying the tension applied to the banding material wound from the latter spool.

9. A machine for applying a permanent band to a body, comprising two independently movable parts adapted to operate simultaneously, one to receive a temporary double ended band from said body and the other to supply a permanent band to said body, said machine being movable about said body in the operation of applying said permanent band.

10. A machine for applying banding material to a body, comprising two spool elements adapted to operate simultaneously, one to receive banding material unwound from said body and the other to supply banding material to said body, said machine being movable about said body in the operation of applying banding material to said body and unwinding banding material from said body.

In testimony whereof I affix my signature, in the presence of two witnesses.

ARTHUR J. BROWN.

Witnesses:
  CHAS. L. BYRON,
  ROB. E. STOLL.